United States Patent [19]

Carespodi

[11] Patent Number: 4,784,885

[45] Date of Patent: Nov. 15, 1988

[54] PEELABLE FILM LAMINATE

[75] Inventor: Dennis L. Carespodi, Winston-Salem, N.C.

[73] Assignee: R. J. Reynolds Tobacco Company, Winston-Salem, N.C.

[21] Appl. No.: 902,340

[22] Filed: Aug. 29, 1986

[51] Int. Cl.$^4$ .................... B32B 27/32; B32B 27/08
[52] U.S. Cl. ........................... 428/36.8; 428/349; 428/462; 428/476.1; 428/483; 428/511; 428/516; 229/43; 229/48 T
[58] Field of Search ............... 428/349, 516, 35, 483, 428/462, 476.1, 511; 229/43, 48 T

[56] References Cited

U.S. PATENT DOCUMENTS

| | | | |
|---|---|---|---|
| 3,496,061 | 2/1970 | Freshour | 161/254 |
| 3,717,533 | 2/1973 | Mayworm et al. | 229/48 T |
| 3,962,018 | 6/1976 | Costemalle et al. | 156/306 |
| 4,189,519 | 2/1980 | Ticknor | 428/476 |
| 4,279,344 | 7/1981 | Holloway | 229/43 |
| 4,284,672 | 8/1981 | Stillman | 428/35 |
| 4,297,411 | 10/1981 | Weiner | 428/347 |
| 4,309,466 | 1/1982 | Stillman | 428/35 |
| 4,339,497 | 7/1982 | Weiner | 428/349 |
| 4,343,852 | 8/1982 | Isaka et al. | 428/216 |
| 4,382,513 | 5/1983 | Shrimer | 229/43 |
| 4,452,842 | 6/1984 | Borges et al. | 229/43 |
| 4,509,197 | 4/1985 | Long | 383/106 |
| 4,537,305 | 8/1985 | Takanashi | 206/438 |
| 4,539,263 | 9/1985 | Hoh | 428/500 |
| 4,542,886 | 9/1985 | Yoshimura et al. | 264/22 |
| 4,550,141 | 10/1985 | Hoh | 525/221 |
| 4,560,598 | 12/1985 | Cowan | 428/35 |
| 4,565,738 | 1/1986 | Purdy | 428/349 |

FOREIGN PATENT DOCUMENTS

| | | | |
|---|---|---|---|
| 107469 | 8/1980 | Japan | 428/35 |
| 2128899 | 5/1984 | United Kingdom | 428/327 |

OTHER PUBLICATIONS

Encyclopedia of Polymer Science and Technology, 1967, John Wiley & Sons, Inc., vol. 7, p. 692.
Olefin Polymers, James N. Short, vol. 16, pp. 385-401.
Exxon Elastomers for Polyolefin Modification, Exxon Chemicals, 1975.
Vistanex Polyisobutylene Properties and Applications, Exxon Chemicals, 1974.
Paxon Pax-Plus Rubber Modified Film Resin, Allied Corporation, 1983.

Primary Examiner—Edith Buffalow
Attorney, Agent, or Firm—Stephen M. Bodenheimer, Jr.

[57] ABSTRACT

The invention provides a packaging laminate which is heat sealable to polypropylene, high density polyethylene or linear low density polyethylene to provide a strong seal which is cleanly peelable at the heat seal interface under hand pressure. The laminate has at least two layers. A heat sealable surface layer is composed of a melt blend comprising between about 55 and 95 wt. % of a substantially linear polyolefin and between about 5 and about 45 wt. % of a polyolefin rubber. The second layer is a heat stable layer which is structurally stable at temperatures in excess of 350° F. or greater and which has sufficient thickness to provide structural stability during heat sealing.

14 Claims, 1 Drawing Sheet

U.S. Patent  Nov. 15, 1988  4,784,885
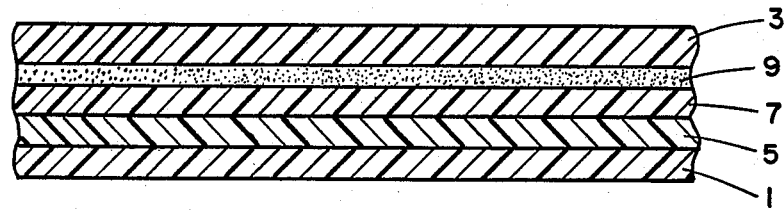
FIG. 1
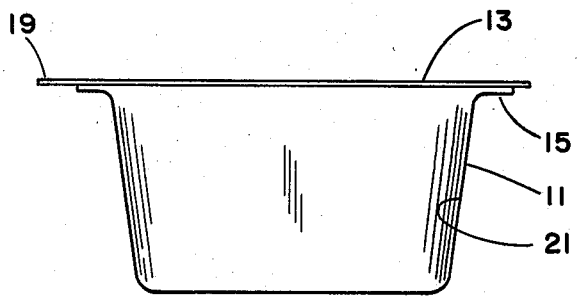
FIG. 2
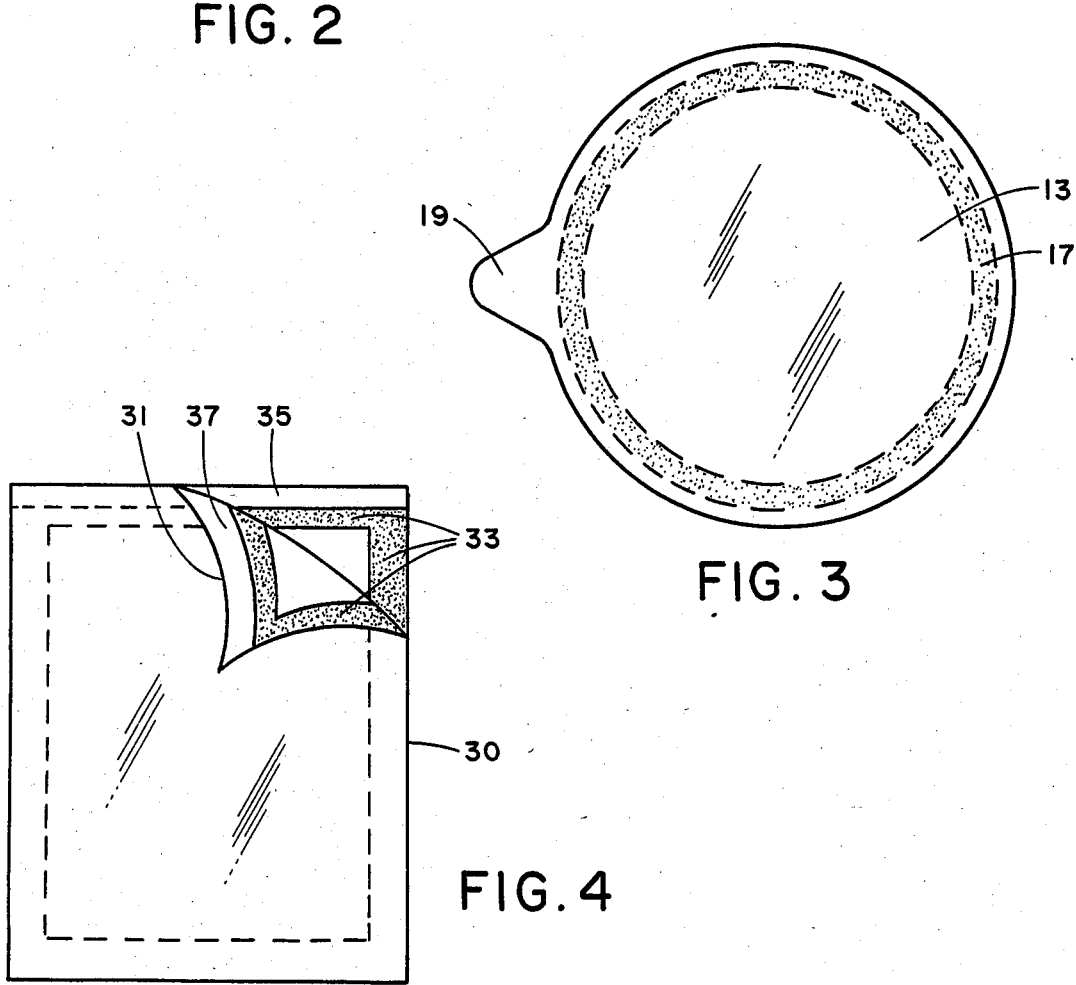
FIG. 3
FIG. 4

PEELABLE FILM LAMINATE

FIELD OF THE INVENTION

The invention relates to film laminates which have a heat sealable surface layer and which can be heat sealed to a high strength polyolefin such as polypropylene or high density polyethylene, to provide a cleanly peelable seal characterized by high strength.

BACKGROUND OF THE INVENTION

Peelably sealed plastic packaging is widely used and available. For example, peelable seals are desirable in sealed, consumer and medical packaged articles, foodstuffs and the like wherein the package may be a sealed bag, cup, blister or other composite container. Polypropylene homopolymer and copolymers and high density polyethylene are one preferred material for construction of plastic packaging because of their high strength, high melting point and durability. However, although various plastics are known to form peelable seals with polypropylene and high density polyethylene, such seals involve shortcomings including low peel strength, or "legging" as the seal is pulled producing stringy fibers at the sealing interface.

Polypropylene and high density polyethylene cups and containers are well suited for use in retort and microwaveable packaging and other packaging which is exposed to relatively high temperatures. But these materials when sealed to themselves produce a fusion, i.e., non-peelable, seal. Thus, when a peelable seal is desired in such packaging, a special adhesive, or a specially designed heat-sealable film must be provided. The resultant seal must have strength at high temperatures, i.e., 180° F. or higher, in order that it retain integrity at hot-fill conditions or at retort conditions. Additionally, in some instances the surface area of the seal will be small, as for example in the case of a lidding closure sealed to the lip of a rigid cup or other container. These applications require unusually strong seals since the seal surface area is small.

SUMMARY OF THE INVENTION

The invention provides a packaging laminate which is heat sealable to polypropylene, high density polyethylene or linear low density polyethylene to provide a strong peelable seal. The packaging laminate of the invention comprises a thermoplastic, heat-sealable surface layer composed of a melt blend comprising between about 55 and about 95 wt.% of a substantially linear polyolefin and 5–45 wt.% of a polyolefin thermoplastic elastomer. The packaging laminate of the invention additionally includes a heat stable second layer which is structurally stable during heat sealing at temperature of about 350° F. or greater and which has sufficient thickness to provide structural stability during heat sealing. In various preferred embodiments of the invention, the substantially linear polyolefin included in the melt blend which makes up the heat sealable surface layer can be high density polyethylene or linear low density polyethylene. The laminate can advantageously include at least one intermediate layer between the surface layer and the second heat stable structural layer. The intermediate layer is stiffer and less elastomeric than the heat-sealable surface layer rendering the overall laminate more susceptible to manufacturing operations such as die cutting. These packaging laminates form exceptionally strong seals with high density polyethylene, linear low density polyethylene and polypropylene. The seals retain strength at high temperature. However, the sealed laminate can be pulled or peeled cleanly from the polypropylene or high density or linear low density polyethylene surface.

In a second aspect, the invention provides a sealed package comprising a pair of members peelably sealed to each other, such as for example, a tray, cup or container member sealed to a closure member such as a lidding. The contacting surface of the first member, i.e., the portion of the interior surface of the first member which is sealed to the second member, consists essentially of polypropylene, high density polyethylene or linear low density polyethylene. The contacting surface of the second member, i.e., the heat sealed interior surface, is a thermoplastic heat sealable polymer composed of a melt blend comprising between about 55 and about 95 wt.% of a substantially linear polyolefin together with about 5–45 wt.% of a polyolefin thermoplastic elastomer. The seal between the first member and the second member is cleanly peelable at the heat seal interface under hand pressure and maintains strength at temperatures in excess of 180° F. Preferably, the seal has a strength in excess of 4 lbs. per inch.

BRIEF DESCRIPTION OF THE DRAWINGS

In the drawings which form a part of the original disclosure of the invention:

FIG. 1 is a partial cross-sectional view of one embodiment of the packaging laminates of the invention;

FIG. 2 is a cross-sectional view of a heat sealed container of the invention;

FIG. 3 is a top elevational view of the sealed container of FIG. 2; and

FIG. 4 is an isometric view of a heat sealed container in accordance with the invention in the form of a flexible pouch wherein the heat-seal is partially peeled.

DETAILED DESCRIPTION OF THE PREFERRED EMBODIMENTS

FIG. 1 illustrates a packaging laminate of the invention including a thermoplastic, heat sealable surface layer 1 which is laminated to heat stable structural layer 3 via optional intermediate layers 5, 7 and 9. The heat sealable thermoplastic surface layer 1 is composed of a melt blend of between about 55 and 95 wt.% of a substantially linear polyolefin and 5–45 wt. % of a polyolefin thermoplastic elastomer.

Substantially linear polyolefins are well known to those skilled in the art and are composed of substantially linear molecules, i.e., molecules having no or only a small degree of chain branching. Such substantially linear polyolefins include high density polyethylene which typically has less than about 1 branch per 200 carbon atoms and is prepared by the polymerization of ethylene under relatively low pressures and temperatures combined with supported transition metal catalysts. High density polyethylenes normally have a density ranging from about 0.940 gms./cc up to about 0.970 gms./cc. Another substantially linear polyolefin is linear low density polyethylene which is prepared by copolymerizing ethylene with another alpha-olefin typically at low pressures and temperatures in the presence of suitable catalysts. Linear low density polyethylenes have densities ranging from about 0.910 to about 0.939 gms./cc. Other substantially linear polyolefins are known to those skilled in the art and include, for example, polypropylene, ethylene-propylene random copolymers, ethylene-propylene-butylene terpolyers and the like. Preferred substantially linear polyolefins are high density polyethylene, linear low density polyethylene and polypropylene homopolymers and copolymers. It will be recognized that the copolymer employed must not result in chain branching sufficient to destroy the substantially linear nature of the polymer. The substantially linear polyolefins are generally characterized by higher modulus, yield strength, tensile strength, and higher strengths at increased temperatures as compared to branched polyolefins.

As indicated previously, such materials when heat sealed to themselves form fusion seals. On the other hand, when these materials are sealed to each other, (e.g., linear low density polyethylene or high density polyethylene heat sealed to polypropylene), a relatively low strength seal, typically substantially less than 4 lbs. per inch, is formed. Surprisingly, it has been found that the addition of a polyolefin thermoplastic elastomer to such substantially linear polyolefins provides a polymer which can be peelably heat sealed to polypropylene, high density and linear low density polyethylene surfaces with unusually strong seal strength at ambient and at high temperatures. Nevertheless, these strong seals can be cleanly peeled at the seal interface in the substantial absence of legging.

Polyolefin thermoplastic elastomers are well known to those skilled in the art and are readily available materials. Such materials are sometimes characterized as "polyolefin rubbers" and include polyisobutylene, EPDM, EPM, butyl rubber, halogenated butyl rubber, isoprene rubber, styrene-butadiene rubber and the like. In brief, EPDM is an ethylene-propylene-diene terpolymer wherein the third polymerization olefin is usually a $C_6$ to $C_{16}$ non-conjugated diolefin, e.g., 1,5-hexadiene, 1,5-octadiene or a 2-alkylnorbornadiene. EPM elastomers are completely saturated ethylene-propylene copolymers. Butyl rubbers are copolymers of 85–89 wt.% isoolefin such as isobutylene with a minor proportion, e.g., 0.1 to 15 wt.% of a $C_4$–$C_{14}$ multiolefin such as butadiene, dimethylbutadiene, piperylene or isoprene; typically 95–99.6 wt.% of isobutylene with 0.5 to 5 wt.% of isoprene. Halogenated butyl rubber is produced by clorinating or brominating butyl rubber. Styrene-butadiene rubber is typically made by copolymerizing about 3 parts by weight butadiene with about 1 part by weight styrene in an emulsion polymerization process. Preferred polyolefin elastomers are polyisobutylene, EDPM, EPM and butyl rubber.

If desired, heat-sealable surface layer, 1, can also include other components such as low density polyethylene or polyolefin copolymers in amounts of up to about 40% by weight, preferably less than about 25% by weight, more preferably less than about 15% by weight. These materials can improve various properties, such as extrudability.

Thermoplastic heat sealable layer 1 is prepared by melt blending the linear polyolefin with the polyolefin thermoplastic elastomer, followed by extrusion or coextrusion to provide layer 1 in the form of a film or film layer. The relative proportion of linear polyolefin and polyolefin thermoplastic elastomer can be varied depending on the specific components used and the desired properties and heat sealing properties of the heat sealant layer 1. For example, increasing the polyolefin thermoplastic elastomer content will typically increase the seal strength of the thermoplastic heat sealable surface film. On the other hand, increasing the content of elastomer will also decrease the modulus while increasing the stretchiness or elasticity of surface layer 1 which may be undesirable in some instances. However, the latter concern may be overcome by including another polymer layer or layers as discussed in detail hereinafter. In preferred embodiments of the invention, the linear polyolefin will constitute 70–95% of the melt blend and the polyolefin rubber will constitute 5–30% of the melt blend.

Heat-sealable surface layer, 1, can have a thickness ranging from about 0.1 mil. to about 5 mil., preferably from about 0.3 mil. to about 2.0 mil. most preferably from about 0.5 mil. to about 1.0 mil. Thick heat sealable layers may adversely affect the susceptibility of the laminate to die cutting.

Layer 3 (FIG. 1) is a heat stable material which is structurally stable at heat sealing temperatures of at least 350° F. which has sufficient thickness to provide structural stability during a heat sealing operation. Layer 3 may be composed of, for example, polyester such as polyethylene-terephthalate, paper or paperboard, foil, biaxially oriented nylon, polymethylpentane or the like. During a heat-sealing process, layer 1 is heated to softening or melting temperature. Heat stable layer 3 provides overall structural integrity to the laminate during the heat sealing operation. Preferably layer 3 is sufficiently heat stable to provide structural stability over the range of heat sealing operations comprising temperatures of from about 350° F. to about 500° F. and dwell times of from about 0.25 sec. to about 1.0 sec. Additionally, layer 3 can provide barrier properties which are important in, for example, food packaging. If desired, layer 1 may be bonded directly to layer 3 (not shown) or may be adhered to layer 3 via an intermediate adhesive layer (not shown). Such structures can be prepared by coextrusion or by separate preparation of a film comprising thermoplastic heat sealable layer 1 and another film comprising the structural layer, e.g., paper or foil material and the separate layers can then be laminated together by any suitable operation.

In a preferred embodiment of the invention, at least one intermediate layer such as layers 5, 7 and 9, is included between heat sealable layer 1 and heat stable layer 3. As indicated previously, the inclusion of the elastomer component in the composition which makes up surface layer 1 lowers the modulus thereof and renders the resultant film more rubbery or elastic. This in turn can render the laminate which includes layer 1 less susceptible to various manufacturing operations such as die cutting, which are often used in preparing lidding stock or pouch components. Intermediate layers 5 and 7 are preferably composed of a stiffer and less elastic material which is compatible with surface layer, 1, such as high density polyethylene, or a blend thereof with low density polyethylene and the resultant laminate will thus have overall properties which include the high modulus properties of layers 5, 7 and 3, rendering the overall laminate more susceptible to manufacturing operations such as die cutting. Preferred compatible materials are those which bond to the heat sealable surface layer during coextrusion without an intermediate adhesive layer and which are less elastic than the heat sealable layer. In this regard, the compatible intermediate layer can advantageously be composed primarily of the same substantially linear polyolefin in the surface layer, 1. Thus the intermediate layer can include at least 60% by weight, preferably 80% by weight or greater of the linear polyolefin.

Where the heat stable structural layer 3 cannot be bonded directly to the heat sealable thermoplastic layer 1 or to the next adjacent intermediate layer, 7, an intermediate adhesive layer, 9 is included in the packaging laminate of the invention. Such adhesive materials are known to those skilled in the art and the choice of adhesive will depend on the composition of the heat stable structural layer 3 and on the composition of the layer to be bonded to layer 3. For example, where layer 3 is a foil such as aluminum foil, and layer 7 consists primarily of a polyolefin such as high density polyethylene, layer 9 can be a solvent based on solventless urethane or polyester adhesive. Similarly, paperboard can be bonded to polyolefin with various adhesives such as low density polyethylene or the above adhesives. Polyesters are bonded to polyolefins by means of the same or similar of adhesives. Biaxially oriented nylon is bonded to polyolefins by means of the same or similar adhesives.

In a preferred embodiment of the invention, heat sealable thermoplastic surface layer 1 together with one or more intermediate layers 5 and 7 are formed in a separate coextrusion operation. Thereupon, the multilayer film laminate comprising layers 1, 5 and 7 is adhesively laminated to the heat stable structural layer 3 by means of an adhesive, 9. By proper formulation of intermediate layers 5 and 7, the overall laminate can be readily die cut even though layer 1 is rubbery or stretchy. Thus, for example, intermediate layers 5 and 7 can be composed primarily of polypropylene, high density polyethylene or linear low density polyethylene to thereby render the overall laminate susceptible to die cutting. Where intermediate layers 5 and 7 are composed primarily of high density polyethylene, another modifying polymer such as low density polyethylene can be included in an amount of up to about 40%, preferably about 20% to improve the extrusion properties of the high density polyethylene.

It will be recognized that the packaging laminates of the invention can also include other intermediate layers to improve, for example, barrier properties, puncture resistance, stiffness or the like and can also include layers exterior to layer 3 to improve, for example, printability or appearance of layer 3.

FIGS. 2, 3 and 4 illustrate heat sealed packages of the invention. In FIGS. 2 and 3, container 11 is heat sealed to lidding 13. The heat seal is effected between lip 15 of the container and the periphery 17 of lidding 13. A pulltab 19 enables lidding 13 to be peeled from container 11 under hand pressure. Lidding 13 is composed of the laminate of the invention. Thus, the interior surface layer of lidding 13 is composed of a thermoplastic, heat sealable surface layer composed of a melt blend comprising between about 55 and about 95 wt.% of a substantially linear polyolefin, e.g., high density polyethylene, and about 5-45 wt.% of a polyolefin thermoplastic elastomer, e.g., polyisobutylene. The internal surface of lip 15 of container 11 is composed of polypropylene, high density polyethylene or linear low density polyethylene, which may include small amounts, preferably 20% or less, most preferably 10% or less, of comonomer or other melt blended components, such as other polyolefins. Preferably, all of the interior surface 21, of container 11, including the interior surface of lip 15 will be composed of a homopolymer of polypropylene, high density polyethylene or linear low density polyethylene. If container 11 is a single layer container, it is preferably composed entirely of polypropylene, high density polyethylene or linear low density polyethylene homopolymer.

It is to be noted that the heat sealing area 17 of closure 13 and the corresponding interior surface of container lip 15 will typically be small, i.e., the heat sealing surface in such containers typically has a width ranging from about 0.03125 in. to about 0.500 in. Because of the small heat sealing surface area, assurance of package seal integrity requires that the seal strength be high, preferably greater than about 4 lbs. per inch, more preferably in the range of between about 5.0 lbs. per inch and about 9.0 lbs. per inch. Heat sealed packages prepared in accordance with this invention can readily meet such requirements. Additionally, when lid 19 is peeled from container 11, the lidding will delaminate from the container at the heat seal interface in the substantial absence of legging. Thus, there will be substantially no stringy fibers generated. This is highly desirable in the packaging industry. Additionally, the sealant layer stress-whitens when the laminate is peeled which can be used to evaluate seal continuity and which also can be used for tamper evaluation.

The heat sealed package shown in FIG. 2 is prepared by any of various packaging operations followed by well known heat sealing operations. The heat seals of the packages of the invention quickly develop substantial strength at high temperatures in excess of 180° F., typically in excess of 200° F. Thus, the packages can be readily utilized in a hot-fill operation wherein a hot food or liquid is placed in container 11 and then lidding 13 is heat sealed to the filled container while hot. Likewise, laminates of the invention are suitable for use in connection with retort containers wherein the sealed package is exposed to high temperature and often high pressure retort conditions which require a strong seal at high temperatures.

Heat sealing will generally be conducted at a temperature in the range of between about 350° and about 500° F. at a dwell time ranging from between about ½ second and about 1.0 seconds. As known to those skilled in the art, the temperature of the heat sealing operation and the length of the dwell time can affect the strength of the heat seal. Additionally, depending on the exact structure of the laminate, the heat sealing temperature and dwell time may need to be varied within the above ranges. For example, where heat stable layer 3 has a poor heat conductivity, a high thickness or the like, higher temperatures and dwell times will be required and vice versa.

FIG. 4 illustrates a heat sealed pouch 30 of the invention having a corner thereof, 31, partially peeled away along heat seal surface 33. Pouch 30 is composed of sheets 35 and 37 which have different interior surfaces. The interior surface of sheet 35 is composed of a heat sealable polymer layer constituting a melt blend comprising between about 55 and about 95 wt.% of linear polyolefin and about 5-45 wt.% of polyolefin thermoplastic elastomer, e.g., 92.5% high density polyethylene and 7.5% by weight EPDM. Sheet 35 preferably also includes a heat stable structural layer such as foil, paperboard, polyester or oriented nylon. Sheet 37 has an interior composed of high density polyethylene, linear low density polyethylene or polypropylene, preferably polypropylene. Sheet 37 can be single or multilayer.

The following examples serve to illustrate preferred embodiment of the invention.

EXAMPLE 1

Blown films having a thickness of 0.0015 inches having the following structures were prepared by coextrusion:

|  | Layer 1 | Layer 2 | Layer |
|---|---|---|---|
| Film 1 Composition | 80% HDPE*/ 20% LDPE** | 80% HDPE/ 20% HDPE | 100% HDPE |
| Film 1 Thickness | 0.0005 IN. | 0.0005 IN. | 0.0005 IN |
| Film 2 Composition | 80% HDPE/ 20% LDPE | 80% HDPE/ 20% LDPE | 92.5% HDPE/ 7.5% PIB*** |
| Film 2 Thickness | 0.0005 IN. | 0.0005 IN. | 0.0005 IN. |
| Film 3 Composition | 80% HDPE/ 20% LDPE | 80% HDPE/ 20% LDPE | 85% HDPE/ 15% PIB |
| Film 3 Thickness | 0.0005 IN. | 0.0005 IN. | 0.0005 IN. |
| Film 4 Composition | 80% HDPE/ 20% LDPE | 80% HDPE/ 20% LDPE | 70% HDPE/ 30% PIB |
| Film 4 Thickness | 0.0005 IN. | 0.0005 IN. | 0.0005 IN. |
| Film 5 Composition | 70% HDPE 30% PIB | 70% HDPE 30% PIB | 70% HDPE 30% PIB |
| Film 5 Thickness | 0.0005 IN. | 0.0005 IN. | 0.0005 IN. |

*High Density Polyethylene, Melt Index 1.15, Density 0.960.
**Low Density Polyethylene, Melt Index 1.3, Density 0.925.
***Polyisobutylene (commercially available as VISTANEX L-120 from Exxon Chemical Americas.

All of these film samples were corona treated on the 80% HDPE/20% LDPE surface. The corona treated surface of the film was then adhesive laminated to the bright side of 0.002 in. aluminum foil using a two-component polyurethane-type curing adhesive (TYCEL 7900/7283 commercially available from LORD CORPORATION, CHEMICAL PRODUCTS GROUP). The laminates were aged to cure the adhesive and were then heat sealed to 0.056 in. thick polypropylene sheet. Heat seals were made at 400° F. and 425° F., at 40 psi. with 1 sec. dwell. The samples were heated from the foil side only. The force required to peel the laminate from the polypropylene sheet is set forth below. The failure mechanism was between the sealant film surface and the sheet surface producing a clean peel.

TABLE II

| Laminate Number | PIB Content of Sealant Layer | Peel Strength (400° F.) | Peel Strength (425° F.) |
|---|---|---|---|
| 1 | 0% | 2.0–2.5 LB./IN. | 2.0–3.0 LB./IN. |
| 2 | 7.5% | 3.5–4.5 LB./IN. | 4.5–6.0 LB./IN. |
| 3 | 15% | 5.0–6.5 LB./IN. | 5.5–6.5 LB./IN. |
| 4 | 30% | 7.0–8.5 LB./IN. | 8.0–9.0 LB./IN. |
| 5 | 30% | 7.0–8.5 LB./IN. | 8.0–9.0 LB./IN. |

This data clearly indicates that peel strength to polypropylene increases as the percentage of polyisobutylene elastomer added to the sealant layer increases. It can also be seen that laminates number 3, 4 and 5 had exceptionally strong peel strength and are thus suitable for use in high stress applications.

EXAMPLE 2

Three layer blown films were prepared as per Example 1. Each layer had a thickness of 0.0005 inches. The total film thickness was 0.0015 inches. The construction of the films was as follows (unless otherwise noted the same polymers were used as an Example 1):

|  | Layer 1 | Layer 2 | Layer 3 |
|---|---|---|---|
| Film 1 Composition | 80% HDPE/ 20% LDPE | 80% HDPE/ 20% LDPE | 70% HDPE/ 30% PIB |
| Film 2 Composition | 80% HDPE/ 20% LDPE | 80% HDPE/ 20% LDPE | 85% HDPE/ 15% PIB |
| Film 3 Composition | 80% HDPE/ 20% LDPE | 80% HDPE/ 20% LDPE | 92.5% HDPE/ 7.5% PIB |
| Film 4 Composition | 80% HDPE/ 20% LDPE | 80% HDPE/ 20% LDPE | HDPE |
| Film 5 Composition | LLDPE*** | LLDPE*** | LLDPE*** |
| Film 6 Composition | LLDPE*** | LLDPE*** | 70% LLDPE*/ 30% PIB |
| Film 7 Composition | LLDPE*** | LLDPE*** | 85% LLDPE*/ 15% PIB |
| Film 8 Composition | LLDPE*** | 85% LLDPE*/ 15% EPDM** | 85% LLDPE*/ 15% EPDM |

*Linear Low Density Polyethylene commercially available as DOWELEX 2101 (DOW CHEMICAL).
**Commercially available as EXXON VISTALON 3708 EPDM.
***Linear Low Density Polyethylene commercial available as MOBIL NTA 101.

The films were corona treated on the surface opposite the sealant surface to enhance wetability and were then adhesive laminated to 2.0 mil. foil, allowed to cure, then heat sealed to 56 mil. polypropylene sheet. Heat seals were made over the temperature range of 350°–450° F. The seals were then pulled on an INSTRON TENSILE tester to measure the force required to peel the laminate from the polypropylene sheet. The failure mechanism was between the sealant film surface and the polypropylene sheet surface producing a clean peel. The following results were obtained:

TABLE 4

| LAMINATE NUMBER | SEALANT LAYER COMPOSITION | SEALING CONDITIONS PRESSURE | DWELL TIME | TEMPERATURE 350° F. | 375° F. | 400° F. | 425° F. | 450° F. |
|---|---|---|---|---|---|---|---|---|
| 1 | 70% HDPE 30% PIB | 40 PSI | 1 SEC. | — | 6.5 LBS./IN. | 7.7 | 7.7 | 7.8 |
| 2 | 85% HDPE 15% PIB | 40 | 1 | — | 4.7 | 5.9 | 6.6 | 7.0 |
| 3 | 92.5% HDPE 7.5% PIB | 40 | 1 | — | 2.8 | 5.3 | 5.6 | 5.2 |
| 4 | HDPE | 40 | 1 | — | 2.1 | 3.1 | 3.1 | 3.3 |
| 5 | LLDPE | 40 | 1 | 1.7 | 1.9 | 1.9 | 1.9 | 1.9 |
| 6 | 70% LLDPE 30% PIB | 40 | 0.5 | 4.0 | 6.3 | 7.0 | 8.3 | 6.0 |
| 6 | 70% LLDPE 30% PIB | 40 | 1 | 6.1 | 6.2 | 6.6 | 6.3 | 5.7 |
| 7 | 85% LLDPE | 40 | 1 | 2.0 | 2.3 | 2.6 | 1.9 | 1.9 |

TABLE 4-continued

| LAMINATE NUMBER | SEALANT LAYER COMPOSITION | SEALING CONDITIONS | | | | | | |
|---|---|---|---|---|---|---|---|---|
| | | PRESSURE | DWELL TIME | TEMPERATURE | | | | |
| | | | | 350° F. | 375° F. | 400° F. | 425° F. | 450° F. |
| 8 | 15% PIB 85% LLDPE 15% EPDM | 40 | 1 | 5.1 | 4.2 | 4.4 | 3.8 | 4.2 |

EXAMPLE 3

Laminates were prepared as in the previous examples and heat sealed to high density polyethylene sheet. The seals were pulled as before. The failure mechanism was between the sealant film surface and the high density polyethylene sheet. Specifics are set forth below.

| Laminate No. | Sealant Layer Comp. | Pres. | Dwell | Heat Seal Temp. °F. | | | | | |
|---|---|---|---|---|---|---|---|---|---|
| | | | | 325 | 350 | 375 | 400 | 425 | 450 |
| 10 | 70% HDPE 30% PIB | 40 psi. | 1.0 sec. | 12.3 lb./in. | 14.0 | 13.8 | 15.0 | 15.1 | 15.9 |
| 11 | 60% LLDPE 40% PIB | 40 psi. | 1.0 sec. | 12.0 lb./in. | 12.9 | 12.5 | 12.8 | 13.3 | 13.3 |

The invention has been described in detail with reference to preferred embodiments. However, variations and modifications can be made within the spirit and scope of the invention as described in the foregoing specification and defined in the appended claims.

What is claimed is:

1. A heat sealable packaging laminate closure member for a container having a closure surface selected from the group consisting of polypropylene, high density polyethylene or linear low density polyethylene, said closure member being capable of forming a strong, cleanly peelable heat seal with said container, said closure member comprising:
   (a) a thermoplastic heat sealable surface layer composed of a melt blend comprising between about 55 and about 95 wt. % of a substantially linear polyolefin and between about 5 and about 45 wt. % of a polyolefin thermoplastic elastomer; and
   (b) a heat stable second layer which is structurally stable during heat sealing at temperatures of about 350° F. or greater and having sufficient thickness to provide structural stability during heat sealing.

2. The packaging laminate defined in claim 1 further including an intermediate polymer layer located between said thermoplastic, heat sealable surface layer and said heat stable second layer, said intermediate layer having higher stiffness and less elasticity than said thermoplastic, heat-sealable surface layer.

3. The packaging laminate defined in claim 2 comprising a plurality of intermediate layers located between said thermoplastic, heat-sealable surface layer and said heat stable second layer, at least one of said intermediate layers having a higher stiffness and lower elasticity than said thermoplastic, heat-sealable surface layer.

4. The packaging laminate defined in claim 1 wherein said thermoplastic heat-sealable surface layer has a thickness ranging from about 0.0001 in. to about 0.005 in.

5. The packaging laminate defined in claim 4 wherein said substantially linear polyolefin is selected from the group consisting of polypropylene, linear low density polyethylene and high density polyethylene.

6. The packaging laminate defined in claim 5 wherein said substantially linear polyolefin is high density polyethylene.

7. The heat sealable packaging laminate defined in claim 1 wherein said heat stable second layer is composed of a material selected from the group consisting of polyester, paper, paperboard, foil and nylon.

8. The heat sealable packaging laminate defined in claim 1 wherein said thermoplastic, heat sealable surface layer comprises between about 5 and about 30 wt.% of a polyolefin thermoplastic elastomer and between about 70 and about 95 wt.% of a substantially linear polyolefin.

9. The packaging laminate definded in claim 8 wherein said polyolefin thermoplastic elastomer is selected from the group consisting of polyisobutylene, EDPM, EPM and butyl rubber.

10. The heat sealable packaging laminate defined in claim 9 wherein the substantially linear polyolefin is selected from the group consisting of high density polyethylene, linear low density polyethylene and polypropylene.

11. A sealed package comprising a pair of members peelably sealed to each other wherein the contacting surface of the first member consists essentially of polypropylene, high density polyethylene or linear low density polyethylene, and wherein the contacting surface of the second member is composed of a thermoplastic heat-sealable polymer which is a melt blend comprising between about 55 and about 95 wt.% of a substantially linear polyolefin together with about 5 to about 45 wt.% of a polyolefin thermoplastic elastomer and wherein the seal between the first member and the second member is cleanly peelable at the heat seal interface, under hand pressure, and maintains strength at temperatures of about 180° F.

12. The sealed package defined in claim 10 wherein said second member is a multi-layer laminate comprising a second layer exterior of the interior surface of said second member, said second layer being structurally stable during heat sealing at temperatures of about 350° F. or greater and having sufficient thickness to provide structural stability to said second member during heat sealing.

13. The sealed package defined in claim 11 wherein said first member has an interior surface consisting essentially of polypropylene and wherein said substantially linear polyolefin contained in the contacting surface of said second member is high density polyethylene.

14. The sealed package defined in claim 11 wherein the second layer of said second member is a material selected from the group consisting of polyester, foil, paper, paperboard, and nylon.

* * * * *